United States Patent [19]

Noel

[11] 4,106,400
[45] Aug. 15, 1978

[54] CONTROLLED PROCESS MUFFIN GRIDDLE

[76] Inventor: Eugene M. Noel, Lowell St., Humarock, Mass. 02047

[21] Appl. No.: 815,496

[22] Filed: Jul. 14, 1977

[51] Int. Cl.² ............................................. A47J 37/00
[52] U.S. Cl. ....................................... 99/373; 99/423; 198/570; 425/453
[58] Field of Search ..................... 99/443 C, 426, 427, 99/448, 386, 423, 372, 373; 198/404, 424, 570; 425/182, 439, 453

[56] References Cited

U.S. PATENT DOCUMENTS

| 1,263,317 | 4/1918 | Garza | 99/373 |
| 2,859,713 | 11/1958 | Noel | 99/423 X |
| 3,673,949 | 7/1972 | Arganbright | 99/443 C |
| 3,747,508 | 7/1973 | Elam | 99/443 C |

Primary Examiner—Billy J. Wilhite
Attorney, Agent, or Firm—John R. Diver

[57] ABSTRACT

A continuous griddle comprising a cover/hearth plate chain web which transports muffin covers in the forward direction and doubles as hearth plates when inverted and moved in the backward direction, and a cup chain web which transports cup flights in coordinate over/under relation with said cover flights and said hearth flights in both forward and backward directions. Lift tracks under said cover flight cooperate with said cup plate web to lift the cups against the covers to flatten the muffin tops during grilling of the muffin. Cover and cup flight turnover means invert said cups and said covers in coordinate relation one to the other with the muffin contained therein during reversal of direction. Hearth plate lowering and cup flight lift tracks over and under said hearth flights and cup flights cooperate with said cover/hearth plate web and said cup plate web, respectively, to withdraw the muffins from said cups without damage thereto.

9 Claims, 6 Drawing Figures

CONTROLLED PROCESS MUFFIN GRIDDLE

BACKGROUND OF THE INVENTION

One of the problems with existing griddles is the muffin damage from "turnover" of the muffin-containing cups and "withdrawal" of the muffins from the cups in preparation for final unloading to a conveyor belt. Present continuous griddles dig the trailing edge of the cups into the muffin and change muffin shape. Muffins also tend to bake non-uniformly during hearth finishing, especially on the leading sides on the lower hearth flight, because they are not withdrawn from the cup flights during hearth but are contained in the unventilated portion of the enclosure. On the other hand, muffins which are fully withdrawn from the cup tend to shift from the center of the flight so they will not brown evenly. Also, in present muffin turn-ups for off-loading, the muffin falls from the cup at turnover and slides a short distance on the bottom of the hearth flight. If adjustment is too close, the trailing edge of the cup will pinch the muffin leaving a lip on the product.

The cornmeal which is used to dust griddle cups presents a real fire hazard. During a production run, cornmeal tends to pile up within the griddle principally because an air blow is used to clean the cups while inverted which blows cornmeal around inside the griddle redistributing it.

On present griddles, traveling covers mount on fixed downward slopes during the cover flight. They do not touch the cup at all until just about the last 2 or 3 feet of travel so that the dough cannot freely rise and develop the desired hockey-puck shape during grilling without constriction by the cover. There is an established need for a cup flight having adjustable cover clearance above the cups so that there will be controlled rise of the doughball in the cup to give flattened tops to the muffins.

SUMMARY OF THE INVENTION

The gist of this invention lies in a continuous muffin griddle having two traveling chain webs, a cover/hearth chain web for transporting covers in the forward direction which double as hearths when inverted and traveled in the backward direction, and a chain cup web for transporting cup flights in over/under coordinate relation with said cover flights in both the forward direction and under/over relation therewith in the backward direction. Cup lifting tracks under said cover flights cooperate with said cup web to lift the cups against the covers above to flatten the tops of the muffin therein during grilling. Cover and cup turnover means at the end of forward travel of said cover, hearth and cup webs invert said cups and covers in coordinate relation one to the other for the backward travel of the same. Hearth lowering and cup lifting tracks are positioned over and under said hearth flights and cup flights for cooperation with said cover/hearth and said cup chain webs, respectively, to fully withdraw the muffins from said cups without damage thereto after final grilling.

Said cup and cover turnover means slidingly lift the cover plates on studs which attach to said cover flight for traveling inside and clearing said cup flights in coordinate relation therewith. A shoe mounts on said cover plate and cooperates with a ramp, which mounts on the frame of the griddle along side of the cover plate, and a guide which further cooperates with and also mounts on said frame in maintaining working clearance between the cover and the inside of a chute for facilitating the turnover. Said chute comprises a fiberglass belt which is arranged for sliding across the surface of a curvilinear guide plate and for freely running on ball-bearing rollers which are mounted at opposite ends thereof supported by the frame of the griddle.

After turnover, heads on said studs which extend down from the cover/hearth chain web in support of the hearth flights depending therefrom, allow the hearth plate to move down in relation to the cup and permit the partial-withdrawal of the muffin which rests on said hearth plates from above.

Vacuum pick-ups mount above and adjacent empty cups on the cup flights after withdrawal of the muffins therefrom, disposed above and adjacent the finish-grilled muffins which rest on said hearth plates from said cups for removal of cornmeal dust therefrom.

DESCRIPTION OF THE PREFERRED EMBODIMENT

Figure 1:
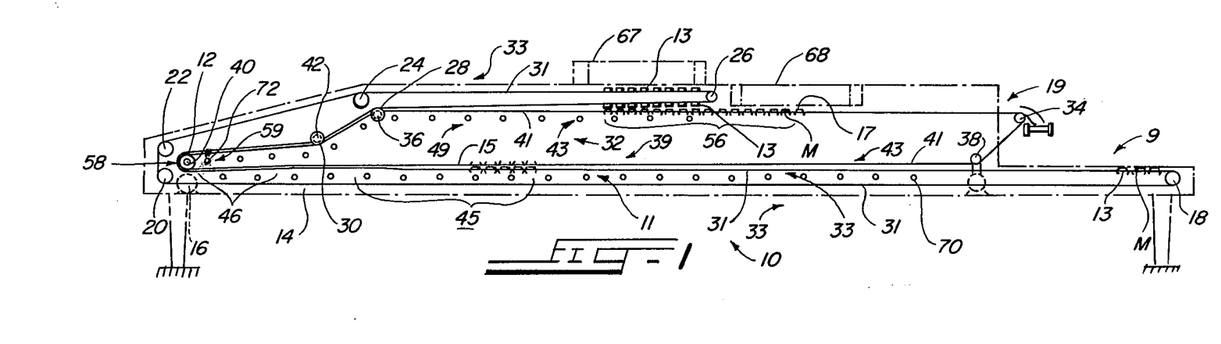
FIG. 1 shows a scale cross-sectional side view of the line diagrams of the cup and cover/hearth chain webs for the continuous griddle of this invention.
Figure 2:
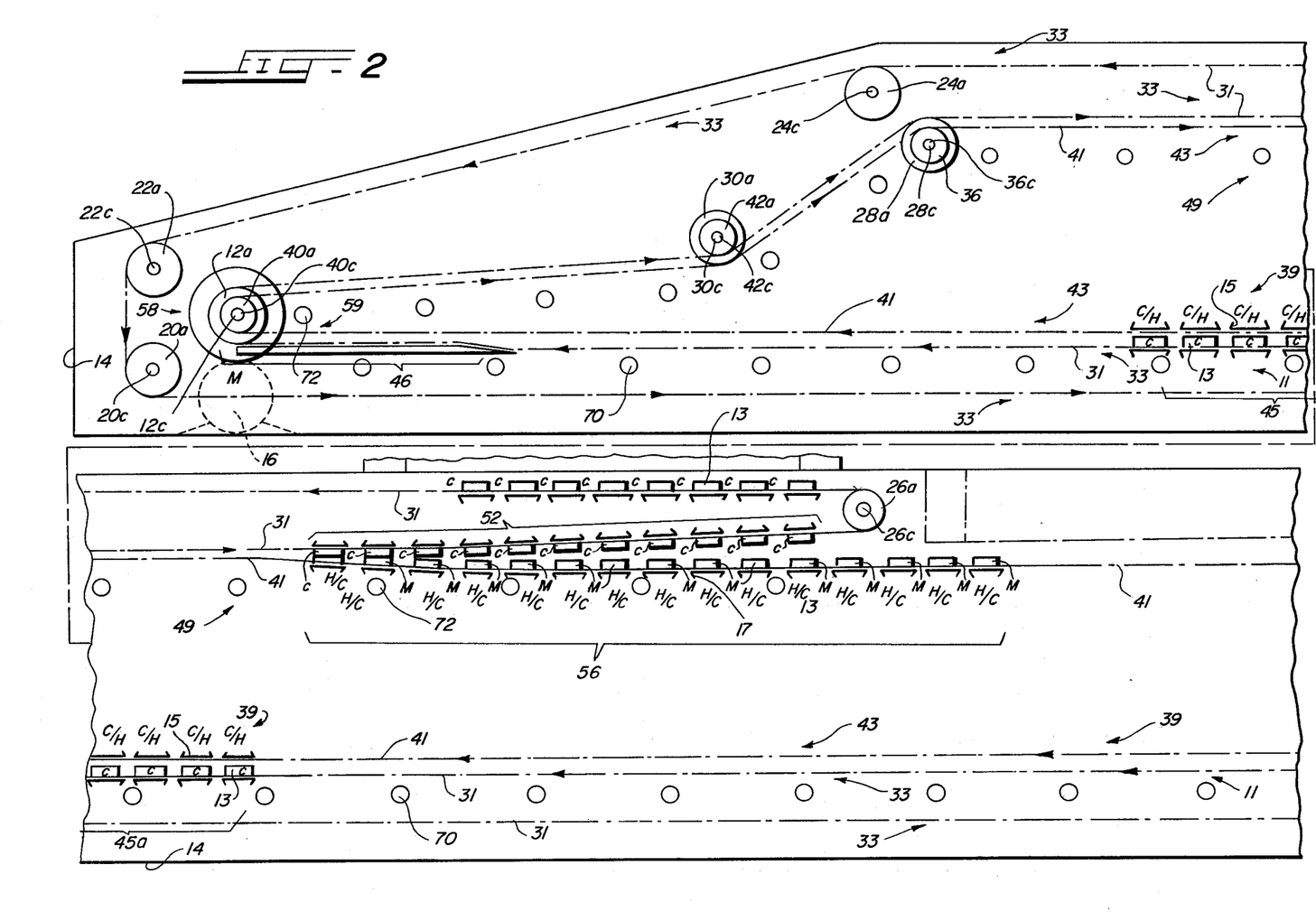
FIG. 2 shows a fragmented blow-up of the cross-sectional side view of the cup lift tracks for closing and opening the clearance between the cover and the cup, the ramp and guide for the cup and cover turnover means, and the hearth flight lowering and cup flight lift tracks for withdrawal of the muffins from the cup.
Figure 3:
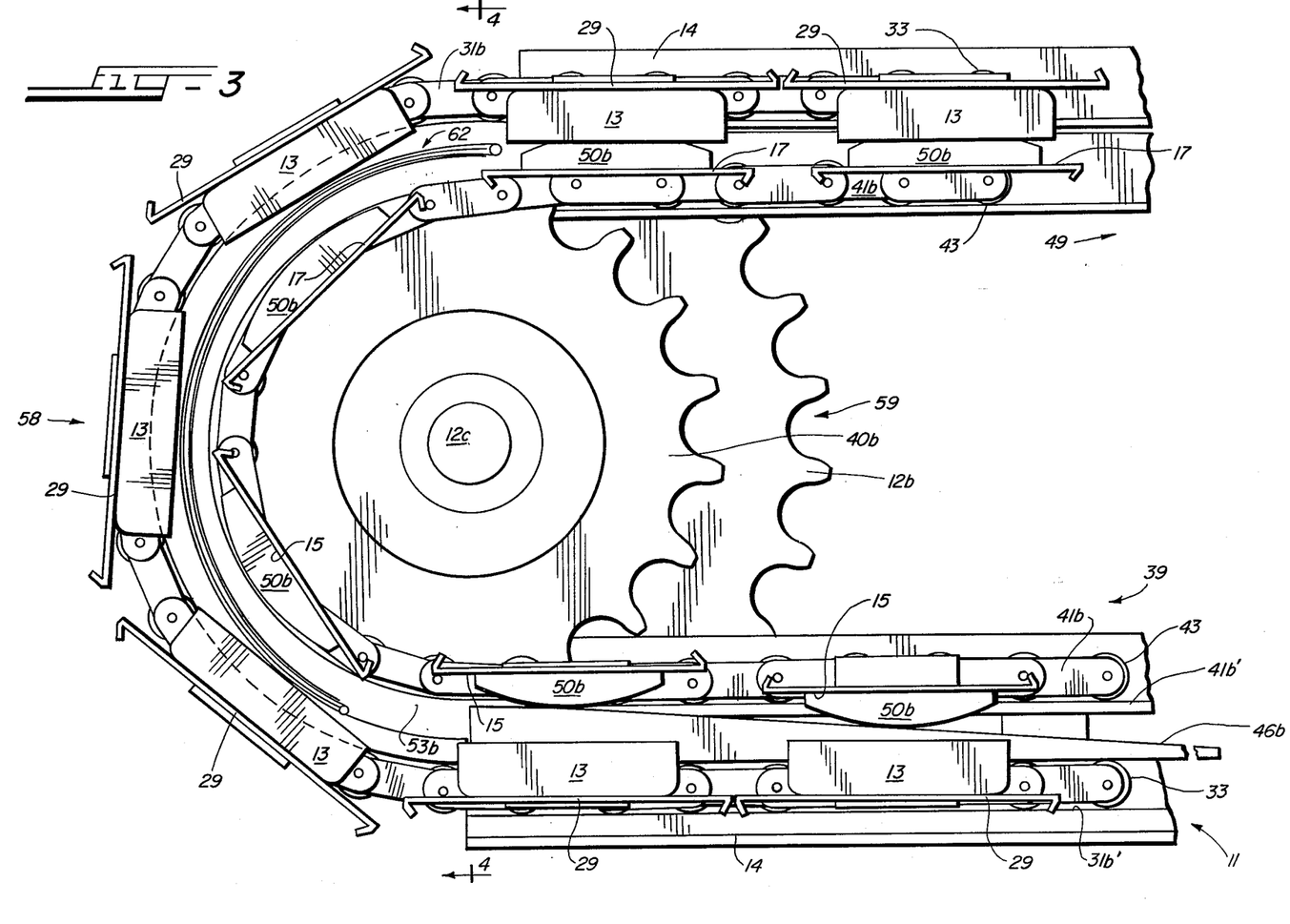
FIG. 3 shows a larger cross-sectional side view of the fragmented blow-up of the cup and cover turnover means.
Figure 4:
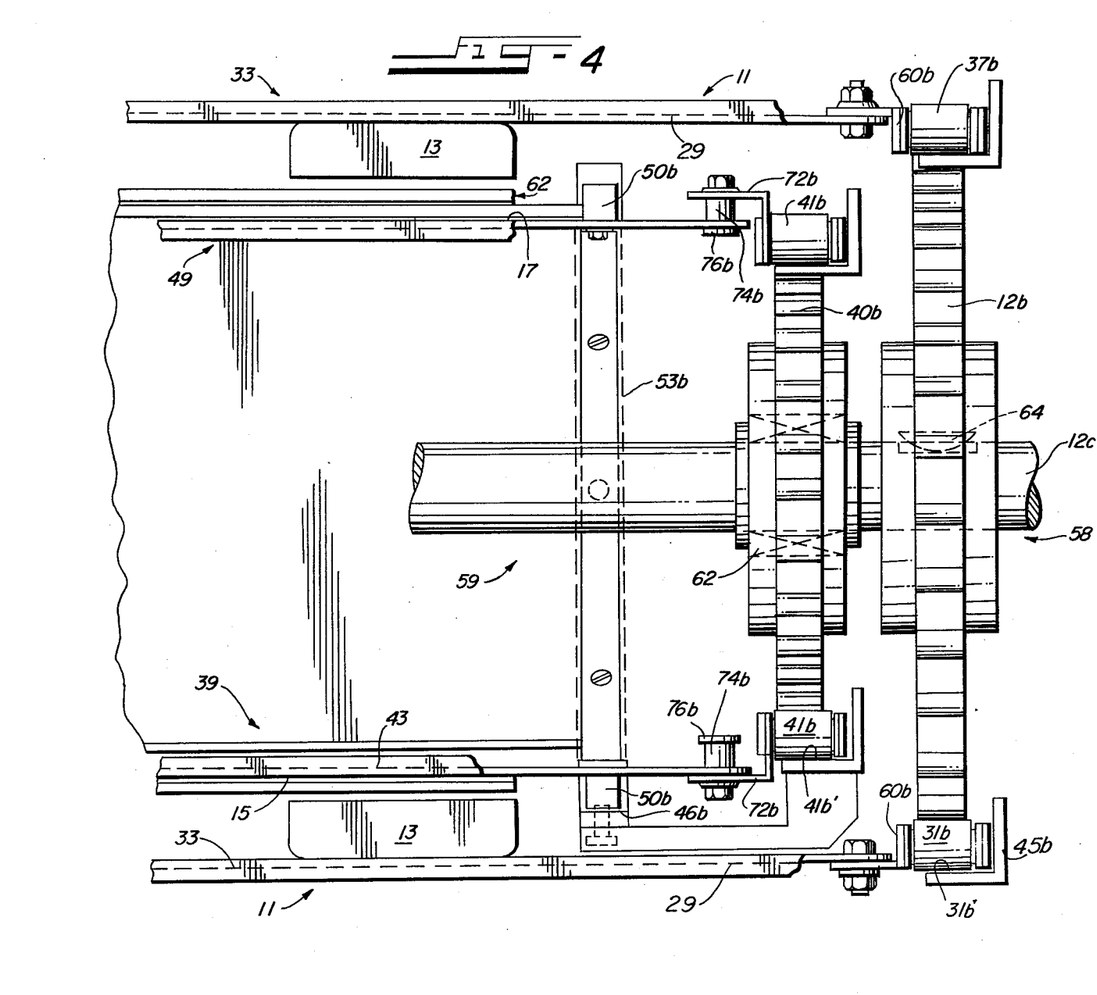
FIG. 4 shows a fragmented cross-sectional end view of the blow-up of the cup and cover turnover means taken along line 4—4 of FIG. 3.
Figure 5:
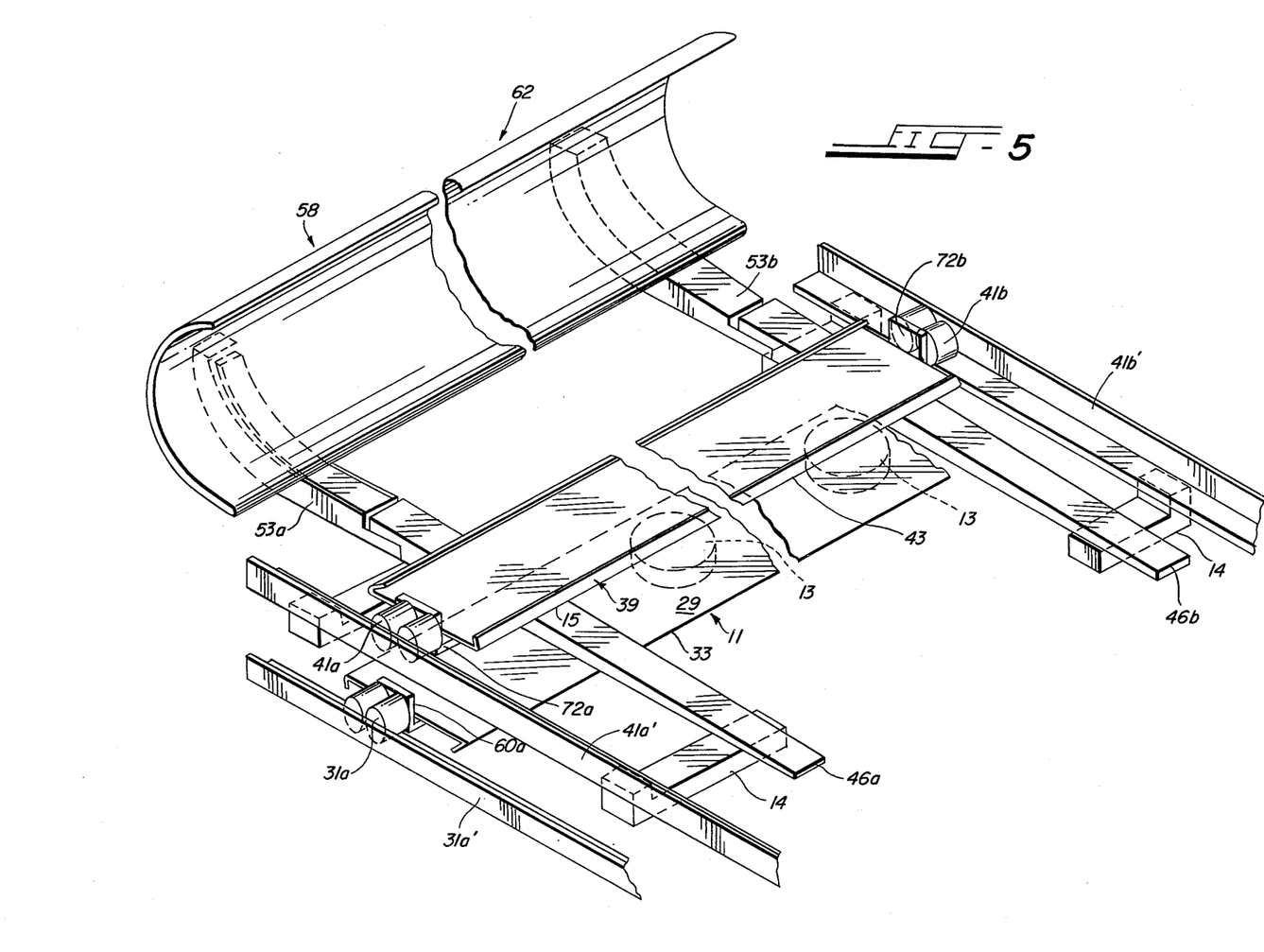
FIG. 5 shows a fragmented perspective view of the muffin turnover means.

Reference to FIG. 1 shows a muffin cup flight conveyor drive train 10 of the preferred embodiment comprising a frame 14 having legs which hold said frame high off the floor allowing for catch pans (not shown) the full length underneath as well as room for sweeping the floor below; a forward-conveying portion of a chain web 33 operationally-mounting on said frame 14 for conveying cups 13 or C in a horizontal and forward direction in the process of grilling the bottoms of muffins M therein over a first plurality of linearly-disposed burners 70, as shown in FIG. 2; an adjustable cup lift section 45 operationally-mounting within said forward-conveying portion of web 33 near the end of the conveying operation thereof; a cup turnover mechanism 58 operationally-mounting on frame 14 having its input in conveying communication with the output from the forward-conveying portion of web 33 for upending cups 13; a backward-conveying portion of said web 33 operationally-mounting on said frame 14 and having its input in conveying communication with and above the output from said forward-conveying portion thereof over a second plurality of linearly-disposed burners 72 for finish-grilling the tops of muffins M in said cups 13; a cup lifting section 52 operationally-mounting in said backward-conveying portion of said web 33 during the latter portion of finish-grilling for withdrawal of the cups 13 from over the muffins during the same; a muffin unload section 19, as shown in FIG. 1, having its input in conveying communication with the output from the backward-conveying portion of said web 33 for unloading the finish-grilled muffins M from said griddle; a cup flight return-conveying portion of said web 33 operationally-mounting on said frame 14 having its input in conveying communication with the output from the backward-conveying portion thereof and its output in conveying communication with the input to said forward-conveying portion of web 33; a plurality of cup flights 11 mounting on said web 33 wherein each flight has twelve 4 inch diameter cups 13 equally-spaced thereacross in a direction transverse to the travel of said flight and at a 6 inch pitch in the direction of travel, as shown in FIGS. 3, 4 and 5.

Reference to FIG. 1 also shows a cover/hearth plate flight conveyor drive train 32 of the preferred embodiment comprising a forward-conveying portion of a web 43 operationally-mounting on said frame 14 for conveying muffin cup covers 15 in parallel and coordinate relation with and adjacently over said cups 13 in forward-conveying portion of web 33 of drive train 8 for constricting the rise of muffins in cups 13 during grilling; a cover turnover mechanism 59 operationally-mounting on frame 14 having its input in conveying communication with the output from the forward-conveying portion of web 43; a backward-conveying portion of web 43 operationally-mounting on said frame 14 having its input in conveying communication with the output from said cover turnover mechanism 59 for conveying hearth plates 17 in parallel and coordinate relation with and adjacently under said cups 13 over the second plurality of linearly-disposed burners 72 for finish-grilling the muffins; a return-conveying portion of said web 43 operationally-mounting on said frame 14 having its input in conveying communication with the output from the backward-conveying portion thereof and its output in conveying communication with the input to said forward-conveying portion of web 43.

Reference to FIGS. 1 and 2 shows drive train 10, which mounts on frame 14 and is driven by a power source 16 through suitable reduction gear (not shown), comprising a drive sprocket set 12 having right and left 12.500 inch pitch diameter sprockets 12a and 12b spaced 90.500 inches apart on the shaft 12c in a direction transverse to the direction of travel of web 33; a first idler sprocket set 18, also having two 12.500 inch pitch diameter sprockets which mount at 90.500 inch sprocket spacing on the same shaft (not shown) about the same pitch center, each sprocket of which is in the same plane containing each sprocket of drive sprocket set 12, said sprocket set 18 mounting its pitch center on frame 14 below the pitch center of said drive sprocket set 12 and spaced therefrom in a backward direction relative thereto, each of said sprockets of said sprocket set 12 and sprocket set 18 having the tops and bottoms of their respective pitch circles tangent to the same horizontal plane.

A second idler sprocket set 20, having sprocket pitch diameters and sprocket spacing identical to that of sprocket sets 12 and 18 and mounting sprockets 20a and right hand sprocket (not shown) in the same planes therewith, mounts its pitch center 20c on frame 14 spaced horizontally from the pitch center of said first idler sprocket set 18 in a direction to the left of the pitch center of said sprocket set 12, and having the bottoms of their respective pitch circles tangent to the same horizontal plane.

A third idler sprocket set 22 comprising sprockets 22a and right hand sprocket (not shown) having the same pitch diameter and sprocket spacing as that of idler sprocket set 20 and contained in the same plane therewith mounts on frame 14 having its pitch center 22c vertically spaced from that of said second idler set 20 and having the left side of its pitch circle tangent to a vertical plane passing through the left side of the pitch circle of idler sprocket set 20.

A fourth idler sprocket set 24 having the same pitch diameter and sprocket spacing as the idler sprocket set 22 mounts its sprockets 24a and right hand sprocket (not shown) in the same planes therewith on frame 14 having its pitch center 24c positioned above and to the right of idler sprocket set 22 and the axis of its pitch center parallel to that of the same.

A fifth idler sprocket set 26 having the same pitch diameter and sprocket spacing as the idler sprocket set 24 mounts its sprockets 26a and right hand sprocket (not shown) in the same planes therewith on frame 14 having its pitch center 26c spaced from and to the right of the idler sprocket set 24 having the tops of their respective pitch circles tangent to the same horizontal plane.

A sixth idler sprocket set 28 having the same pitch diameter and sprocket spacing as drive sprocket set 12 mounts its sprockets 28a and right hand sprocket (not shown) in the same planes therewith on frame 14 having its center 28c spaced from and to the left of the idler sprocket set 26 horizontally between it and the pitch center of drive sprocket set 12 and vertically between the pitch centers of idler sprocket set 24 and drive sprocket set 12. A slack take-up idler sprocket set 30 having the same pitch diameter and sprocket distance as the idler sprocket set 28 mounts on frame 14 spaced from and to the left of the idler sprocket set 28 horizontally between it and the pitch center of drive sprocket set 12 and vertically between the pitch centers of idler sprocket set 28 and drive sprocket set 12.

First endless traveling chains 31a and 31b of first chain set 30 in drive train 10 as shown in FIGS. 3, 4 and 5, which are spaced 90.500 inches apart externally engage the outside of the pitch circles of each right and left sprocket, respectively, of said sprocket sets 12, 18, 20, 22, 24, 26 and 28 and engage the inside of the pitch circles of each right and left sprocket of slack take-up sprocket set 30. Cup plates 29 on traveling webs 33 mount at each end on brackets left hand (not shown) and 60b to each of chains 31a and 31b, respectively, and bear a transverse relation with respect to the direction of travel thereof.

Referring again to FIGS. 1 and 2, a cover/hearth drive train 32, which mounts on frame 14 and is driven by the power source 16 through a suitable reduction gear (not shown) having the same output speed as the reduction gear connected to cup drive train 10, comprises a drive sprocket set 34 having right and left 8.500 inch pitch diameter sprockets (not shown) spaced 86.000 inches apart in concentric relation on a drive shaft (not shown) in a direction transverse to the direction of travel of web 43.

A first idler sprocket set 36 having two 8.500 inch pitch diameter sprockets 36a and right hand sprocket (not shown) mounts in concentric relation on a drive shaft 36c on said frame 14 each sprocket thereof contained in a plane containing each of the sprockets of sprocket drive set 34 and spaced 86.000 inches apart an amount equidistant between the sprockets of drive train 10. Sprocket set 34 mounts on frame 14 spaced to the right of idler sprocket set 36 having the tops of the pitch circles of each of their respective sprockets tangent to the same horizontal plane.

A second idler sprocket set 38, having sprocket pitch diameters and sprocket spacing identical to that of sprocket sets 34 and 36 and mounting sprockets (not shown) in the same planes therewith, mounts its pitch center (not shown) on frame 14 horizontally spaced to the left and vertically spaced below that of the drive sprocket set 34, and having the bottom of its pitch circle positioned adjacent to and spaced above the horizontal plane tangent to the tops of the pitch circles of idler sprocket set 18 and the bottoms of the pitch circles of drive sprocket set 12 of cup flight drive train 10, respectively.

A third idler sprocket set 40 having sprockets 40a and 40b of the same pitch diameter and the same sprocket spacing in identical sprocket planes as that of idler sprocket set 38 mounts on frame 14 and has its pitch center 40c in coaxial relation with that of drive sprocket set 12 of drive train 10 and a smaller pitch diameter relative thereto so that the bottoms of the pitch circles of both said sprocket sets 40 and 38 lie on the same horizontal plane.

A fourth idler sprocket set 42 having sprockets 42a and right hand sprocket (not shown) of the same pitch diameter and the same sprocket spacing in identical sprocket planes as the third idler sprocket set 40 mounts on frame 14 and has its pitch center 42c in coaxial relation with that of slack take-up idler sprocket set 30 of drive train 10 and a smaller pitch diameter relative thereto.

Second endless traveling chains 41a and 41b of chain set 41 in drive train 32, as shown in FIGS. 3, 4 and 5, which are spaced 86.000 inches apart externally engage the outside of the pitch circles of each of right and left sprockets, respectively, of said sprocket sets 34, 36, 38, 40 and 42 and engage the inside of the pitch circle of each right and left sprocket of slack take-up sprocket set 42. Cover and hearth plates 15 and 17 on traveling webs 43 bracket-mount at each end of each of chains 41a and 41b, respectively, and bear a transverse relation with respect to the direction of travel thereof.

Traveling web 43 which mounts on endless chains 41a and 41b coordinates with respect to traveling web 33 which mounts on endless chains 31a and 31b through common drive power source 16, as shown in FIGS. 1 and 2, and slides in engagement with chain tracks 41a' and 41b' and 31a' and 31b', respectively. Twelve 6 inch pitch, transversely-spaced, 4 inch diameter cups 13 mount on the top of each cup plate 29 on traveling web 33 forming one cup flight 11. 5 inch × 89 inch cover plates 15 for each of the twelve cups 13 of flight 11 each mount on the bottom of traveling web 43 forming cover flights 39.

Cup flights 11 mount on traveling web 33 comprising roller chains 31a and 31b, as shown in FIGS. 3, 4 and 5, which are bridged by cup plates 29 which are bolted to brackets 60a and 60b mounted on the inside of chains 31a and 31b, as shown in FIGS. 4 and 5. Cups 13 mount on the cup plates 29 having their open tops facing up during cup flight 11 before cup turnover 58 and open tops facing down in the finishing hearth flight 49 thereon.

Cup flight lift tracks 45a and 45b of lift track set 45, as shown in FIGS. 1, 2 and 5, mount on adjustable brackets (not shown) on each side of traveling web 33 on frame 14 during the latter part of the cup flight 11 for lifting cup flight 11 to the cover flight 39, as shown in FIGS. 1 and 2, for the constricted rise of the doughball in the cups 13 during cup flight 11.

Cup flight turnover mechanism 58 comprises traveling web 33 having spaced roller chains 31a and 31b, as shown in FIGS. 3, 4 and 5, and cup plates 29 which bridge the space between said roller chains 31a and 31b and fixedly bolt on brackets 60a and 60b adjacent the inward sides of chains 31a and 31b, respectively.

Cover flight lift ramps 46a and 46b of lift ramp set 46, as shown in FIGS. 1, 2, 3, 4 and 5, mount on adjustable brackets 48 (not shown) on frame 14 on each side of traveling web 43 at the terminal portion of the cup flight 11. Cover flight turnover mechanism 59 comprises traveling web 43 having spaced roller chains 41a and 41b, as shown in FIGS. 3, 4 and 5, and cover plates 15 which bridge the space between said roller chains 41a and 41b and slidingly-mount on studs left hand (not shown) and 74b which extend inwardly therefrom on brackets 72a and 72b adjacent the inward sides of chains 41a and 41b, respectively. Shoes left hand (not shown) and 50b, as shown in FIGS. 3 and 4, mount on cover flights 39 on each side of said traveling web 43 and operationally engage said ramps 46a and 46b, respectively, for lifting cover flights 39 from cup flights 11 on said studs 74a and 74b, as shown in FIGS. 1, 2, 3 and 4 in preparation for controlled cover turnover 59.

Cover flight turnover guides 53a and 53b, as shown in FIGS. 3, 4 and 5, mount on adjustable brackets (not shown) on frame 14 on each side of traveling web 43 equidistant between sprockets 40a and 40b and spaced 79 inches apart. Shoes 50a and 50b which are spaced 79 inches apart, as shown in FIGS. 3 and 4, each operationally engage said guides 53a and 53b, respectively, on cover flights 39, as shown in FIGS. 1, 2 and 3, for controlled turnover 59 of flights 39 on smaller pitch circle than that for turnover 58 of cup flights 11 for working clearance purposes.

Figure 6:
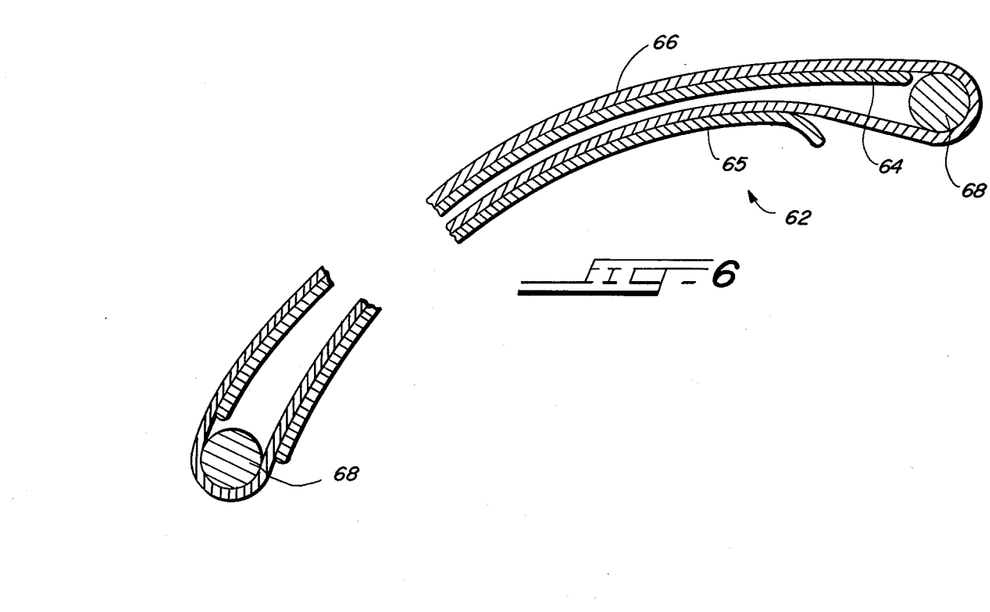
FIG. 6 shows a fragmented cross-sectional view of the muffin guide chute.

Muffin turnover chute 62, as shown in FIGS. 3 and 5, which is 89 inches long, mounts on adjustable brackets (not shown) on frame 14 equidistant between sprockets 40a and 40b, and covers the open top of cups 13 as they move from lower position on turnover 58 to upper position thereover and retain muffins in cups 13 during the controlled turnover of muffins therein in preparation for finished baking on hearth plate flight 17. Chute 62 comprises a curvilinear guide plate 64, as shown in FIG. 6, which mounts on frame 14 from guide track 41a to guide track 41b and from the lower position of turnover 58 to upper position thereabove around said sprockets 40a and 40b, as shown in FIGS. 3 and 5, an inside belt cover and guide 65 mounted on frame 14 in parallely-spaced relation with relation to said guide plate 64, ball-bearing mounted idler rollers 68 which are mounted on frame 14 at each end of said guide plate 64, and an endless fiberglass belt 66 which envelops said guide plate 64 and both rollers 68 on the outside thereof and under the belt cover and guide 65.

Hearth-supporting web plates 43 slidingly-mount on studs left hand (not shown) and 74b which extend downwardly from finishing hearth flight 49 on brackets 72a and 72b, as shown in FIGS. 4 and 5. Heads left hand (not shown) and 76b mount on extended ends of studs 74a and 74b and permit a controlled partial withdrawal of the muffins M from the cups 13 for finishing hearth flight 49.

Cup flight lift tracks (not shown) of lift track set 52, as shown in FIGS. 1 and 2, mount on adjustable brackets (not shown) on frame 14 on each side of traveling web 33 during the latter part of the finishing hearth flight 49. Chains 31a and 31b on each side of said traveling web 33, respectively, engage said tracks 52 for lifting the cup flight 11 above the finishing hearth flight 49 for a controlled full withdrawal of the muffins M from cups 13 in preparation for unloading.

Hearth flight lowering track set 56, as shown in FIGS. 1 and 2, mount on adjustable brackets (not shown) on frame 14 on each side of traveling web 43 during the latter part of finishing hearth flight 49. Chains 41a and 41b on each side of traveling webs 43, respectively, engage said tracks 56 for lowering the finishing hearth flight 49 relative to the lifting of the cup flight 11, as shown in FIGS. 1 and 2, for a controlled full withdrawal of the muffins M from cups 13 in preparation for unloading.

A cup-return vacuum pick-up 67 mounts on frame 14 above and adjacent to the return-conveying portion of the web 33. A finish-grill vacuum pick-up 68 mounts on frame 14 above and adjacent to backward-conveying portion of web 43.

Referring to FIG. 4, roller bearings 62 mount on cup flight 11 of drive shaft 12c in the hub of idler sprockets 40a and 40b, respectively, for concentric rotation thereabout, and keys 64 insert between the hubs of drive sprockets 12a and 12b and drive shaft 12c, for driving the same. Keys (not shown) insert between the hubs of drive sprocket set 34 on cover flights 39 and a drive shaft for driving the same.

Referring to FIG. 1, the operation of a typical griddle for producing grilled muffins at the rate of one thousand dozen per hour comprises the steps of:

Loading station 9 with doughballs having 12 cups 13 per cup flight 11 and requiring 18 cup flights 11 per minute, which, with cup flights 11 at 6-inch pitch, requires a chain 31 speed of 8½ feet per minute;

Resting the doughballs in cup flights for 3 minutes after onloading station 9, by a cup flight run of 25½ (3 × 8½) feet from idler sprocket set 18 to first burner 70;

Grilling the lower part of the muffins in cups 13 over burners 70 under covers 15 lasting 4 minutes and requiring a 34 (4 × 8½) foot run of the cup flight 11;

Raising cups 13 against covers 15 on cup flight lift track 45 lasting 1 minute and requiring an 8-inch run of the cup flight 11 starting about 24 feet from idler sprocket set 18;

Upending the muffins in cups 13 by turnover mechanism 58 having ramps 46 mounted on frame 14 which are engaged by shoes 50 mounted on covers 15 and maintaining the coordinate relation between cup flight 11 and cover flight 39 in the 180° turnover 58 by means of a guide chute 62 which comprises a guide plate 64 which is curvilinear in the direction of transport of muffins M.

First stage grilling of the upper part of the muffins on hearth plates 17 when partially withdrawn from the cups 13 over burner 72 lasting part of a 3½ minute cycle and requiring a portion of a 25½ (3½ × 8½) foot run of hearth flight 49;

Second stage grilling of the upper part of the muffins on hearth plates 17 when further withdrawn from the cups 13 over burners 72 lasting the balance of the 3½ minute cycle and requiring the rest of the 25½ foot run of hearth flight 49;

Full withdrawal of muffins from cups 13 on hearth plates 17 by lifting cup flight 11 on cup flight lift track 52 and simultaneous lowering of hearth plates 17 on hearth flight lowering track 56 while maintaining coordinate traveling relation one to the other;

Vacuum removal of loose cornmeal and flour from the empty cup flight 11 during return-conveying of muffins to load section 9;

Vacuum removal of loose cornmeal and flour from the muffins on hearth flight 49 upon completion of second stage drilling;

Unloading the muffins from offload section 19.

Although but one specific embodiment of this invention is herein shown and described, it will be understood that details of the construction shown may be altered or omitted without departing from the spirit of the invention as defined by the following claims.

I claim:

1. A continuous muffin griddle comprising:
   a. a frame;
   b. a prime mover mounted on said frame;
   c. a cup conveying web including a doughball loading station at the input end thereof operationally mounted on said frame having a forward cup conveying portion operationally mounted on said frame in horizontal orientation thereon including an input end in coordinate conveying communication with the output of said doughball loading station and an output end therefrom, and a plurality of burners arranged in parallel distributed array thereunder; said cup conveying web having a driving connection with said prime mover at its output end; a cup turnover portion, having a cup turnover means, operationally mounted on said frame having an input in coordinated conveying communication with the output end of the forward conveying portion of said cup conveying web; a backward cup conveying portion of said cup conveying web operationally mounted on said frame in horizontal orientation thereon and vertically spaced above the forward cup conveying portion of said cup conveying web including an input end in coordinated conveying communication with the output of the cup turnover means and a terminating end therefrom; and a cup return conveying portion of said cup conveying web operationally mounted on said frame having its input end in coordinated conveying communication with the output end of said backward cup conveying portion and its output end in coordinated conveying communication with the input to said doughball loading station; and
   d. a cover/hearth conveying web including a muffin offloading station at the output therefrom operationally mounted on said frame and functioning as a cover traveling over and in parallel and adjacent coordinated traveling relation with said forward cup conveying portion of said cup conveying web, and having a starting end thereover in extended forward travel relation with respect to said cup conveying doughball loading station and an output end in coterminus travel and concentric relation with the output end of the forward cup conveying portion of said cup conveying web; a cover/hearth turnover portion operationally mounted on said frame having an input in coordinated conveying communication with the output end of the forward conveying portion of said cover/hearth conveying web and in operational connection with said cup turnover means in said cup conveying web for coordinated cooperation therebetween; a backward cover/hearth conveying portion of said cover/hearth conveying web operationally mounted on said frame beneath the backward conveying portion of the cup conveying web and functioning as a hearth plate traveling in parallel and adjacent coordinated relation with the backward cup conveying portion of said cup conveying web, said backward cover/hearth conveyor portion having a plurality of burners arranged in parallel distributed array thereunder and having a muffin offloading station in extended backward travel relation with respect to the terminating end of said backward cup conveying portion of said cup conveying web, and a driving connection with said prime mover at said muffin offloading station; and a cover/hearth return conveying portion of said cover/hearth conveying web operationally mounted on said frame in coordinated conveying communication with the muffin offloading station at the output end of said backward cover/hearth conveying portion.

2. A continuous muffin griddle comprising:
a. a frame;
b. a prime mover mounted on said frame;
c. a cup conveying web including a doughball loading station at the input end thereof operationally mounted on said frame having a forward cup conveying portion operationally mounted on said frame in horizontal orientation thereon including an input end in coordinate conveying communication with the output of said doughball loading station and an output end therefrom, and a plurality of burners arranged in parallel distributed array thereunder; said cup conveying web having a driving connection with said prime mover at its output end; a cup lift section in said forward cup conveying portion operationally mounted on said frame in parallel and partially coextensive coordinated traveling relation with said forward cup conveying portion; a cup turnover portion, having a cup turnover means, operationally mounted on said frame having an input in coordinated conveying communication with the output end of the forward conveying portion of said cup conveying web; a backward cup conveying portion of said cup conveying web operationally mounted on said frame in horizontal orientation thereon and vertically spaced above the forward cup conveying portion of said cup conveying web including an input end in coordinated conveying communication with the output of the cup turnover means and a terminating end therefrom; a cup lift section in said backward cup conveying portion of said cup conveying web operationally mounting on said frame in parallel and partially coextensive coordinated traveling relation with the backward cup conveying portion; and a cup return conveying portion of said cup conveying web operationally mounted on said frame having its input end in coordinated conveying communication with the output end of said backward cup conveying portion and its output end in coordinated conveying communication with the input to said doughball loading station; and
d. a cover/hearth conveying web including a muffin offloading station at the output therefrom operationally mounted on said frame and functioning as a cover traveling over and in parallel and adjacent coordinated traveling relation with said forward cup conveying portion of said cup conveying web, and having a starting end thereover in extended forward travel relation with respect to said cup conveying doughball loading station and an output end in coterminus travel and concentric relation with the output end of the forward cup conveying portion of said cup conveying web; a cover/hearth turnover portion, having a cup turnover means, operationally mounted on said frame having an input in coordinated conveying communication with the output end of the forward conveying portion of said cover/hearth conveying web and in operational connection with said cup turnover means in said cup conveying web for coordinated cooperation therebetween; a backward cover/hearth conveying portion of said cover/hearth conveying web operationally mounted on said frame, vertically spaced above the forward cover/hearth conveying portion of said cover/hearth conveying web a distance less than the vertically spaced distance between the forward cup conveying portion and beneath the backward conveying portion of the cup conveying web, and functioning as a hearth plate traveling in parallel and adjacent coordinated traveling relation with the backward cup conveying portion of said cup conveying web, said backward cover/hearth conveyor portion having a plurality of burners arranged in parallel distributed array thereunder and having a muffin offloading station in extended backward travel relation with respect to the terminating end of said backward cup conveying portion of said cup conveying web, and a driving connection with said prime mover at said muffin offloading station; a cover lowering section in said backward cover/hearth conveying portion of said cover/hearth conveying web operationally mounted on said frame in parallel and partially coextensive coordinated traveling relation with said backward cover/hearth conveying portion of said cover/hearth conveying web; and a cover/hearth return conveying portion of said cover/hearth conveying web operationally mounted on said frame in coordinated conveying communication with the muffin offloading station at the output end of said backward cover/hearth conveying portion.

3. In a continuous muffin griddle as set forth in claim 2 wherein the cup conveying web comprises two tracks having means for mounting the same to the frame in a longitudinal direction spaced one from the other in transverse relation to the direction of doughball/muffin travel; two roller chains, each having bracket means mounted thereon at predetermined pitch in the direction of travel thereof, for slidingly engaging each track in the longitudinal direction thereon; and a plurality of plates for mounting said cups, each having a generally rectangular shape, and each bolted to said bracket means on said chains at each end of said plate.

4. In a continuous muffin griddle as set forth in claim 3 wherein the cup lift section comprises two tracks each having lifted bracket means for mounting the same to the frame.

5. In a continuous muffin griddle as set forth in claim 2 wherein the cover/hearth conveying web comprises two tracks having means for mounting the same to the frame in a longitudinal direction spaced one from the other in transverse relation to the direction of doughball/muffin travel a distance greater than the spaced relation between said tracks for the cup conveying web; two roller chains, each having brackets mounted thereon at the same pitch in the direction of travel thereof, for slidingly engaging each track in the longitudinal direction thereon; and a plurality of cover/hearth plates, each having a generally rectangular shape and each slidingly-mounted on studs affixed to the brackets on said chains at each end of said plates for lifting said plates relative to said chains during the forward cover/hearth conveying portion, and lowering said plates relative to said chains during the backward cover/hearth conveying portion of said cover/hearth conveying web.

6. In a continuous muffin griddle as set forth in claim 5 wherein the cover/hearth lowering section comprises two tracks each having lowered bracket means for mounting the same to the frame.

7. In a continuous muffin griddle as set forth in claim 3 wherein the cup turnover means comprises a rotatable shaft spaced vertically halfway between said tracks for the forward conveying portion and said tracks for the backward conveying portion of said cup conveying web at the end thereof and directed in transverse relation to the direction of doughball/muffin travel; two spaced cup conveying sprockets fixedly mounted on said shaft having a pitch diameter equal to the vertical spacing between the tracks of said forward conveying and backward cup conveying portions during the cup turnover portion.

8. In a continuous muffin griddle as set forth in claim 7 wherein the cover/hearth turnover means comprises two cover/hearth conveying sprockets rotatably mounted on said rotatable shaft spaced between said cup conveying sprockets and having a pitch diameter less than that of the cup conveying sprockets and equal to the vertical spacing between the tracks for said forward conveying portion and said backward conveying portion of said cup conveying web at the beginning thereof; a ramp means mounted on said frame adjacent each of said tracks during said forward cover/hearth conveying portion adjacent to each of said cover/hearth sprockets; a shoe means mounted on the ends of each cover/hearth plate operationally engaging said ramp means for lifting said plates relative to said chains during the forward cover/hearth conveying portion at the end thereof; a semi-circumferential guide means mounted on said frame in geometrical continuity with the ramp means at the end of the forward cover/hearth conveying portion operationally engaging said shoe means during the cover turnover portion; and a muffin guide chute means mounted on said frame between said cup conveying web and said cover/hearth conveying web after the end of the forward cup conveying portion and before the beginning of the backward cup conveying portion.

9. In a continuous muffin griddle as set forth in claim 8 wherein the muffin guide chute comprises a guide plate having a rectangular form curvilinear in the direction across the short dimension thereof; an idler roller along and adjacent to each of the long sides thereof; a continuous glass-fiber belt engaging both of said rollers for sliding on the convex surface of the guide plate; and a belt guide adjacent to the concave surface thereof for constraining the belt to pass close thereto in its return from sliding on said guide plate.

* * * * *